US009728787B2

(12) United States Patent
Shinto et al.

(10) Patent No.: US 9,728,787 B2
(45) Date of Patent: Aug. 8, 2017

(54) CURRENT COLLECTING STRUCTURE FOR SECONDARY BATTERY AND SECONDARY BATTERY

(71) Applicant: Shin-Kobe Electric Machinery Co., Ltd., Tokyo (JP)

(72) Inventors: Murashi Shinto, Tokyo (JP); Akira Tanaka, Tokyo (JP); Kenzou Ikeda, Tokyo (JP)

(73) Assignee: HITACHI CHEMICAL COMPANY, LTD., Tokyo (JP)

( * ) Notice: Subject to any disclaimer, the term of this patent is extended or adjusted under 35 U.S.C. 154(b) by 374 days.

(21) Appl. No.: 14/414,999

(22) PCT Filed: Jul. 16, 2013

(86) PCT No.: PCT/JP2013/069315
§ 371 (c)(1),
(2) Date: Jan. 15, 2015

(87) PCT Pub. No.: WO2014/013992
PCT Pub. Date: Jan. 23, 2014

(65) Prior Publication Data
US 2015/0188146 A1 Jul. 2, 2015

(30) Foreign Application Priority Data
Jul. 17, 2012 (JP) .................. 2012-158681

(51) Int. Cl.
*H01M 4/70* (2006.01)
*H01M 2/22* (2006.01)
(Continued)

(52) U.S. Cl.
CPC .............. *H01M 4/70* (2013.01); *H01M 2/22* (2013.01); *H01M 2/26* (2013.01); *H01M 2/30* (2013.01)

(58) Field of Classification Search
CPC ............ H01M 4/70; H01M 2/22; H01M 2/26; H01M 2/30; H01M 10/0431; H01M 10/123
See application file for complete search history.

(56) References Cited

U.S. PATENT DOCUMENTS

2009/0081532 A1   3/2009   Kaplin
2012/0148913 A1*  6/2012   Chiba ............... H01M 2/024
                                                429/179
(Continued)

FOREIGN PATENT DOCUMENTS

CN   101779310 A   7/2010
CN   102468457 A   5/2012
(Continued)

OTHER PUBLICATIONS

Office Action for Chinese Application No. 201380037978.9, together with English language translation thereof.
(Continued)

*Primary Examiner* — Ula C Ruddock
*Assistant Examiner* — Thomas Parsons
(74) *Attorney, Agent, or Firm* — Fitch, Even, Tabin & Flannery LLP

(57) ABSTRACT

A current collecting structure for which the installation space for current collecting plates is not increased more than necessary even if the number of electrodes to be stacked is increased to increase the capacity of a secondary battery is provided. Positive current collecting plates 41a to 41j constituting a positive current collecting plate stacking portion 27 are bent at bent portions 47a to 47j to constitute fixed portions 43a to 43j and welded portions 45a to 45j, respectively. The angles of the bent portions 47a to 47e are 80°, 90°, 100°, 110°, and 120°, respectively. The angles of the bent portions 47f to 47j are 120°, 110°, 100°, 90°, and 80°, (Continued)

respectively. Negative current collecting plates are also bent in the same manner.

18 Claims, 9 Drawing Sheets

(51) Int. Cl.
*H01M 2/26* (2006.01)
*H01M 2/30* (2006.01)

(56) References Cited

U.S. PATENT DOCUMENTS

| | | | | |
|---|---|---|---|---|
| 2013/0295430 | A1* | 11/2013 | Kurahashi | H01M 2/0217 429/120 |
| 2015/0086847 | A1* | 3/2015 | Minagata | H01M 2/26 429/162 |
| 2015/0104694 | A1* | 4/2015 | Okuda | H01M 2/22 429/162 |

FOREIGN PATENT DOCUMENTS

| | | |
|---|---|---|
| JP | 3-71562 U | 7/1991 |
| JP | 8-111216 A | 4/1996 |
| JP | 9-213299 A | 8/1997 |
| JP | 2001-210303 A | 8/2001 |
| JP | 4494731 B2 | 6/2010 |
| JP | 2010-541131 A | 12/2010 |
| JP | 2013-51057 A | 3/2013 |
| JP | 5783331 B2 | 9/2015 |

OTHER PUBLICATIONS

Notice of Reasons for Refusal drafted Mar. 13, 2015 (undersigned has been advised that this document was mailed on Mar. 17, 2015), for Japanese Application No. 2014-525826, together with English language translation thereof.
Written Argument filed May 18, 2015, for Japanese Application No. 2014-525826, together with Engiish language translation thereof.
Decision to Grant a Patent drafted Jun. 16, 2015 (undersigned has been advised that this document was mailed on Jun. 23, 2015), for Japanese Application No. 2014-525826, together with English language translation thereof.
Written Amendment filed May 18, 2015, for Japanese Application No. 2014-525826, together with English language translation thereof.
Allowed Claims for Japanese Application No. 5783331.
Search Report for Chinese Application No. 201380037978.9.
Notice of Preliminary Rejection dated Apr. 19, 2017, in Korean Patnent Application No. 10-2014-7034732.

* cited by examiner

CURRENT COLLECTING STRUCTURE FOR SECONDARY BATTERY AND SECONDARY BATTERY

TECHNICAL FIELD

The present invention relates to a current collecting structure for a secondary battery, and to a secondary battery.

BACKGROUND ART

Non-aqueous electrolyte secondary batteries such as lithium ion batteries advantageously have a high energy density, a low self-discharge rate, and good cycle performance. Therefore, in recent years, it has been expected to increase the size or the capacity of the non-aqueous electrolyte secondary batteries to use such secondary batteries as power sources for various types of industrial machinery and equipment. In order to increase the capacity of the non-aqueous electrolyte secondary batteries, it is necessary to increase the number of electrodes to be housed in the non-aqueous electrolyte secondary battery.

It is necessary to electrically connect the electrodes to an electrode terminal. Therefore, if it is attempted to connect the electrodes to an electrode terminal in a non-aqueous electrolyte secondary battery in which an increased number of electrodes are housed, a connection portion of the electrode terminal must be increased in size to secure a region for connection to the electrodes. In addition, a space for connection of a large number of electrodes is necessary around the connection portion of the electrode terminal. If the number of electrodes is increased, further, the resistance at the connection portion between tabs of the large number of electrodes and the electrode terminal is increased. In order to address such issues, Japanese Patent No. 4494731 (Patent Document 1) discloses a secondary battery in which: a plurality of assemblies in which tabs of a plurality of electrodes are welded to an L-shaped current collecting lead (current collecting plate); portions of a plurality of current collecting leads to which the tabs are welded are disposed at intervals to extend in parallel with each other; and base portions of the plurality of current collecting leads are disposed to overlap each other to be bolted and welded to a connection portion of an electrode terminal.

RELATED-ART DOCUMENT

Patent Document

Patent Document 1: Japanese Patent No. 4494731

SUMMARY OF INVENTION

Technical Problem

These days, there are secondary batteries with a maximum discharge current of up to 100 A. In such secondary batteries, several hundreds of electrodes may be stacked to constitute an electrode group, and the number of current collecting plates that connect the tabs of the electrodes is also inevitably increased.

If the number of current collecting plates to be stacked is increased, the electrode group is increased in dimension in the stacking direction of the electrodes. Therefore, there is a significant difference between the distance from the terminal body portion to an electrode located close to the terminal body portion and the distance from the terminal body portion to an electrode located away from the terminal body portion.

In the secondary batteries according to the related art, in which portions of current collecting plates to which tabs of a plurality of electrodes are welded are arranged in parallel with each other as described in Patent Document 1, for example, to electrically connect the tabs of the plurality of electrodes at different distances from a terminal body portion to a terminal, an increase in number of current collecting plates increases the space for arrangement of the plurality of current collecting plates, and inevitably increases the size of the secondary battery.

An object of the present invention is to provide a current collecting structure for a secondary battery, and a secondary battery, for which the installation space for current collecting plates is not increased more than necessary even if the number of electrodes to be stacked is increased to increase the capacity of the secondary battery.

Another object of the present invention is to provide a secondary battery that allows use of electrodes with tabs of the same shape even if the number of electrodes to be stacked is increased to increase the capacity of the secondary battery.

Solution to Problem

The present invention improves a current collecting structure for a secondary battery including an electrode group including a plurality of electrodes each having a tab and stacked via a separator. The current collecting structure according to the present invention includes a plurality of current collecting plates and a terminal. The tabs of the plurality of electrodes of the same polarity are welded to the plurality of current collecting plates. The terminal includes a terminal body portion and a terminal portion. The plurality of current collecting plates divided into two groups are attached to the terminal body portion. The plurality of current collecting plates used in the present invention each include a fixed portion and a welded portion onto which the tabs are welded in an overlapping manner. The fixed portions of the current collecting plates are stacked to form a current collecting plate stacking portion to be fixed to the terminal body portion. The plurality of current collecting plates are each bent so as to form a bent portion having a predetermined angle between the fixed portion and the welded portion. The plurality of current collecting plates belonging to at least one of the two groups are further divided into a first divided group located closer to the terminal body portion and a second divided group located farther from the terminal body portion. The predetermined angle for the bent portions of the current collecting plates belonging to the first divided group is determined such that the predetermined angle of the bent portion of one of two adjacent current collecting plates that is located closer to the terminal body portion is smaller than the predetermined angle of the bent portion of the other current collecting plate that is located farther from the terminal body portion. The predetermined angle for the bent portions of the current collecting plates belonging to the second divided group is determined such that the predetermined angle of the bent portion of one of two adjacent current collecting plates that is located closer to the terminal body portion is larger than the predetermined angle of the bent portion of the other current collecting plate that is located farther from the terminal body portion.

In the current collecting structure according to the present invention, the welded portions of the current collecting plates are configured to radially extend from an end portion of the current collecting plate stacking portion on the electrode group side. As a result, a necessary number of current collecting plates can be disposed in a limited space by determining the predetermined angle as appropriate even if the number of current collecting plates is increased. Thus, according to the present invention, it is not necessary to increase the size of a space for arrangement of the plurality of current collecting plates even if the number of current collecting plates is increased. All of the welded portions of the plurality of current collecting plates may be of the same length, or some or all of such welded portions may be of different lengths. In addition, all of the predetermined angles between two adjacent current collecting plates may be the same angle, or some or all of such angles may be different angles. The plurality of current collecting plates belonging to the other group may have any current collecting structure.

The tabs of the plurality of electrodes to be welded to the welded portion of a current collecting plate may be routed in any manner. Preferably, however, such tabs are routed not to contact tabs to be welded to another current collecting plate.

The present invention may also be implemented as a current collecting structure in which one current collecting plate stacking portion is fixed to the terminal body portion. In this case, the current collecting structure is configured such that a first divided group and a second divided group are provided without dividing the plurality of current collecting plates into two groups.

Preferably, the predetermined angle of the bent portion of one of the plurality of current collecting plates belonging to the first divided group that is located the closest to the terminal body portion is an acute angle, and the predetermined angle of the bent portion of one of the plurality of current collecting plates belonging to the second divided group that is located the farthest from the terminal body portion is an acute angle. With such a configuration, a space that is adjacent to the terminal body portion can be used as a space for routing the tabs. Thus, the number of current collecting plates can be increased compared to a case where the predetermined angle of the bent portion of the current collecting plate that is located the farthest from the terminal body portion is an obtuse angle.

The current collecting structure according to the present invention may be configured such that the plurality of current collecting plates are divided into two groups and the plurality of current collecting plates belonging to each of the two groups may not be divided into first and second divided groups. In this case, for example, the plurality of current collecting plates belonging to one of the two groups are disposed such that the plurality of welded portions are located in a region that faces a surface of the terminal body portion located opposite to a surface of the terminal body portion on which the terminal portion is located. Then, the predetermined angle for the bent portions of the plurality of current collecting plates is determined such that the predetermined angle of the bent portion of one of two adjacent current collecting plates that is located closer to the terminal body portion is smaller than the predetermined angle of the bent portion of the other current collecting plate that is located farther from the terminal body portion. With such a configuration, the plurality of welded portions can be disposed in the region between the terminal body portion and the electrode group. Therefore, the welded portions of the electrodes located in the region that faces the surface of the terminal body portion located opposite to the surface of the terminal body portion on which the terminal portion is located can be easily welded. Alternatively, the plurality of current collecting plates may be disposed such that the plurality of welded portions are located in a region that faces a surface of the terminal body portion located opposite to a surface of the terminal body portion on which the terminal portion is located without dividing the plurality of current collecting plates into groups at all.

If the plurality of current collecting plates are disposed such that the plurality of welded portions are located in a region that faces a surface of the terminal body portion located opposite to a surface of the terminal body portion on which the terminal portion is located, the predetermined angle of the bent portion of one of the plurality of current collecting plates that is located the closest to the terminal body portion is preferably an acute angle.

The plurality of current collecting plates may be disposed such that the plurality of welded portions are located outside a region that faces a surface of the terminal body portion located opposite to a surface of the terminal body portion on which the terminal portion is located. In this case, the predetermined angle for the bent portions of the plurality of current collecting plates is determined such that the predetermined angle of the bent portion of one of two adjacent current collecting plates that is located closer to the terminal body portion is larger than the predetermined angle of the bent portion of the other current collecting plate that is located farther from the terminal body portion. With such a configuration, the plurality of welded portions can be disposed outside the region between the terminal body portion and the electrode group. Therefore, the welded portions of the electrodes located outside the region that faces the surface of the terminal body portion located opposite to the surface of the terminal body portion on which the terminal portion is located can be easily welded. Alternatively, the plurality of current collecting plates may be disposed such that the plurality of welded portions are located outside a region that faces a surface of the terminal body portion located opposite to a surface of the terminal body portion on which the terminal portion is located without dividing the plurality of current collecting plates into groups at all.

If the plurality of current collecting plates are disposed such that the plurality of welded portions are located outside a region that faces a surface of the terminal body portion located opposite to a surface of the terminal body portion on which the terminal portion is located, the predetermined angle of the bent portion of one of the plurality of current collecting plates that is located the farthest from the terminal body portion is preferably an acute angle.

If the difference between the predetermined angles of the bent portions of two adjacent current collecting plates is too small, the space between the welded portions of the two adjacent current collecting plates may be so narrow that a sufficient number of tabs of electrodes may not be welded to each current collecting plate. If the difference between the predetermined angles of the bent portions of two adjacent current collecting plates is too large, meanwhile, a desired number of current collecting plates may not be welded to the terminal body portion although an increased number of tabs of electrodes can be welded to each current collecting plate. Thus, a difference between the predetermined angles of the bent portions of the two adjacent current collecting plates is preferably 5° to 15°. If the difference between the predetermined angles is in such a range, both the number of tabs of electrodes that can be welded to each current collecting plate and the number of current collecting plates that can be welded to the terminal body portion can be increased. As a matter of course, the difference between the predetermined angles may be outside the above range depending on the output, the configuration, or the like of the secondary battery on which the terminal structure according to the present invention is mounted.

If the plurality of current collecting plates are divided into two groups, the plurality of current collecting plates are preferably fixed to two end surfaces of the terminal body portion that are opposite to each other in a stacking direction of the electrodes of the electrode group. With such a configuration, an increased number of electrodes can be connected compared to a case where a current collecting plate stacking portion is fixed to only one end surface of the terminal body portion. In addition, the plurality of current collecting plates divided into two groups can be easily connected to the terminal body portion.

The present invention can also be implemented for non-aqueous electrolyte secondary batteries.

DESCRIPTION OF EMBODIMENTS

Figure 1:
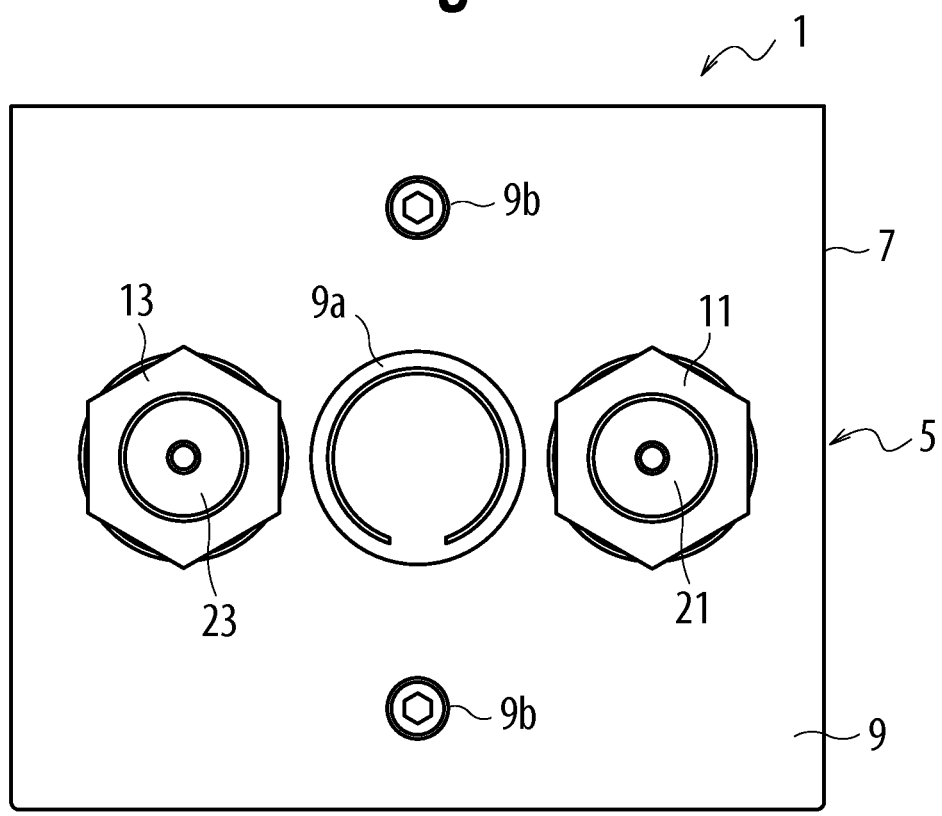
FIG. 1 is a plan view of a lithium-ion secondary battery as a non-aqueous electrolyte secondary battery with a current collecting structure according to an embodiment of the present invention.
Figure 2:
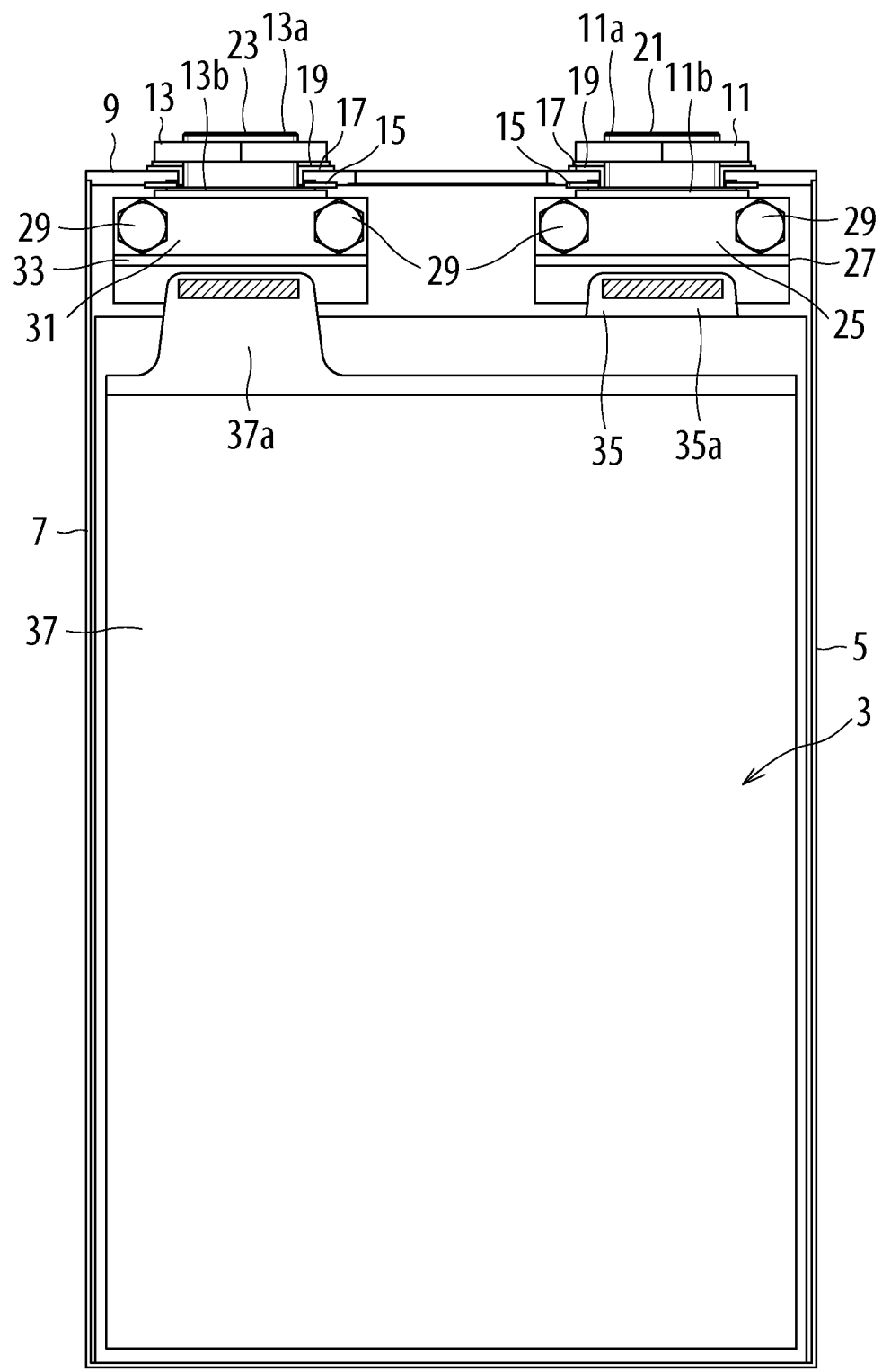
FIG. 2 is a front view illustrating the internal structure of the lithium-ion secondary battery according to the embodiment of FIG. 1.

The configuration of a current collecting structure and a secondary battery according to an embodiment of the present invention will be described in detail below with reference to the drawings. FIG. 1 is a plan view of a lithium-ion secondary battery 1 as a non-aqueous electrolyte secondary battery to which a current collecting structure according to an embodiment of the present invention is applied. FIG. 2 is a front view illustrating the internal structure of the lithium-ion secondary battery 1. In the embodiment, in order to facilitate understanding, some components are depicted with exaggeration in terms of thicknesses.

As illustrated in FIGS. 1 and 2, the lithium-ion secondary battery 1 according to the embodiment includes an electrode group 3 and a rectangular battery container 5 made of stainless steel and configured to house the electrode group 3 therein. The battery container 5 includes a battery case 7 having an opening at one end portion, and a battery lid 9. After the electrode group 3 is inserted into the battery case 7, the peripheral portion of the opening of the battery case 7 and the peripheral portion of the battery lid 9 are welded to each other to tightly close the battery container 5.

A positive terminal 11 and a negative terminal 13 made of aluminum are fixed to the battery lid 9. The positive terminal 11 and the negative terminal 13 have terminal portions 11a and 13a that project out of the battery container 5 through the lid plate of the battery lid 9, and terminal body portions 11b and 13b disposed in the battery container 5, respectively. An annular inner packing 15 is provided between each of the positive terminal 11 and the negative terminal 13 and the battery lid 9. An annular outer packing 17 and a terminal washer 19 are provided in an overlapping manner on the outer side of the battery lid 9 at positions opposite to the inner packings 15 via the battery lid 9. The positive terminal 11 and the negative terminal 13 are fixed to the battery lid 9 by a positive terminal nut 21 and a negative terminal nut 23, respectively, provided at the distal end of a threaded portion via the inner packing 15, the outer packing 17, and the terminal washer 19. The inner packings 15 and the outer packings 17 are provided at portions of the battery lid 9 provided with the positive terminal 11 and the negative terminal 13 to secure a tightly sealed state of a space in the battery container 5.

A gas discharge valve 9a to which a stainless foil has been welded and liquid injection ports 9b are disposed in the battery lid 9. The gas discharge valve 9a has a function of discharging a gas inside the battery when the internal pressure of the battery is raised to crack the stainless foil. A non-aqueous electrolyte (not illustrated) prepared by dissolving lithium phosphate hexafluoride ($LiPF_6$) or lithium tetrafluoroborate ($LiBF_4$) in a mixed solvent of ethylene carbonate and dimethyl carbonate is injected from the liquid injection ports 9b. After the electrolyte is injected, the liquid injection ports 9b are tightly closed by liquid port plugs.

A positive pressing member 25 and a positive current collecting plate stacking portion 27 are attached to the terminal body portion 11b of the positive terminal 11 by bolts 29. Meanwhile, a negative pressing member 31 and a negative current collecting plate stacking portion 33 are attached to the terminal body portion 13b of the negative terminal 13 by bolts 29.

Figure 3:
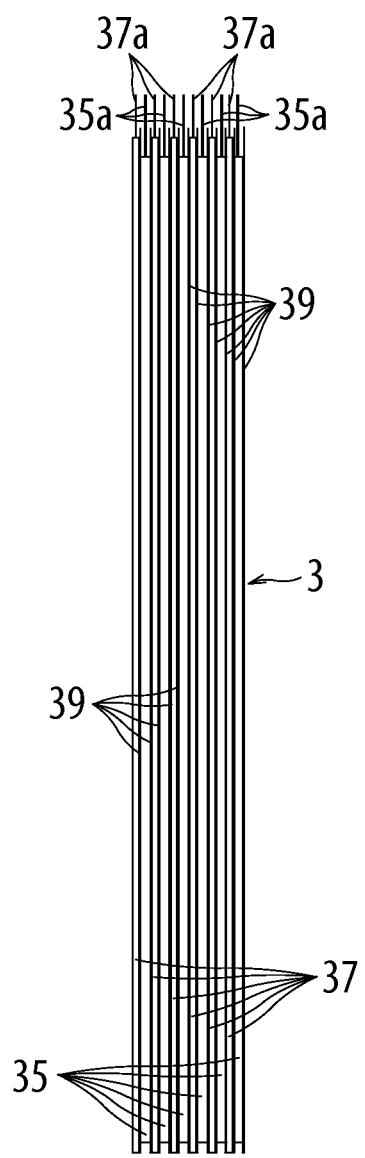
FIG. 3 is a right side view of an electrode group according to the embodiment of FIG. 1.

FIG. 3 is a right side view of the electrode group 3 according to the embodiment. In FIG. 3, in order to facilitate understanding, the components are schematically illustrated. Therefore, the components illustrated in FIG. 3 differ in shape, dimension, etc. from the actual components of the electrode group. The electrode group 3 is constituted by alternately stacking a plurality of positive electrodes 35 and a plurality of negative electrodes 37 via separators 39. The separators 39 prevent the positive electrodes 35 and the negative electrodes 37 from contacting each other to cause a short circuit.

The positive electrode 35 includes a positive current collector formed from an aluminum foil formed in a substantially rectangular plate shape, and positive active material layers provided on both surfaces of the positive current collector. The positive active material layers are formed by preparing slurry by mixing powder of a lithium manganese double oxide, flake graphite as a conducting agent, and polyvinylidene fluoride (PVDF) as a binding agent at a weight ratio of 85:10:5, for example, adding N-methylpyrrolidone (NMP) as a dispersion solvent to the mixture, and kneading the mixture, applying the slurry to the positive current collector, and thereafter drying and pressing the positive current collector. A positive tab 35a is integrally formed on a side of the positive current collector extending along the battery lid 9. The positive tab 35a is joined to a positive current collecting plate to be discussed later by ultrasonic welding or laser welding. The plurality of positive electrodes 35 and the plurality of positive tabs 35a are formed in the same shape.

The negative electrode 37 includes a negative current collector formed from an electrolytic copper foil formed in a substantially rectangular plate shape, and negative active material layers provided on both surfaces of the negative current collector. The active material layers are formed by preparing slurry by adding 10 parts by mass of PVDF as a binding agent to 90 parts by mass of powder of amorphous carbon as a negative active material, for example, adding NMP as a dispersion solvent to the mixture, and kneading the mixture, applying the slurry to both surfaces of an electrolytic copper foil with a thickness of 10 μm, and thereafter drying and pressing the electrolytic copper foil. A negative tab 37a is integrally formed on a side of the negative current collector extending along the battery lid 9. The negative tab 37a is formed not to face the positive tab 35a when the positive electrodes 35 and the negative electrodes 37 are stacked. The negative tab 37a is joined to a negative current collecting plate to be discussed later by ultrasonic welding or laser welding. The plurality of negative electrodes 37 and the plurality of negative tabs 37a are formed in the same shape.

The separators 39 are formed in a substantially rectangular sheet shape from a porous material made of polyethylene that enables passage of lithium ions. The separators 39 are sized to hinder contact between the positive current collectors of the positive electrodes 35 and the negative current collectors of the negative electrodes 37 in a stacked state.

In FIG. 3, in order to facilitate illustration, only six positive electrodes, six negative electrodes, and twelve separators are illustrated. In the lithium-ion secondary battery 1 according to the embodiment, however, 360 positive electrodes, 360 negative electrodes, and 720 separators are stacked to constitute the electrode group 3.

Figure 4:
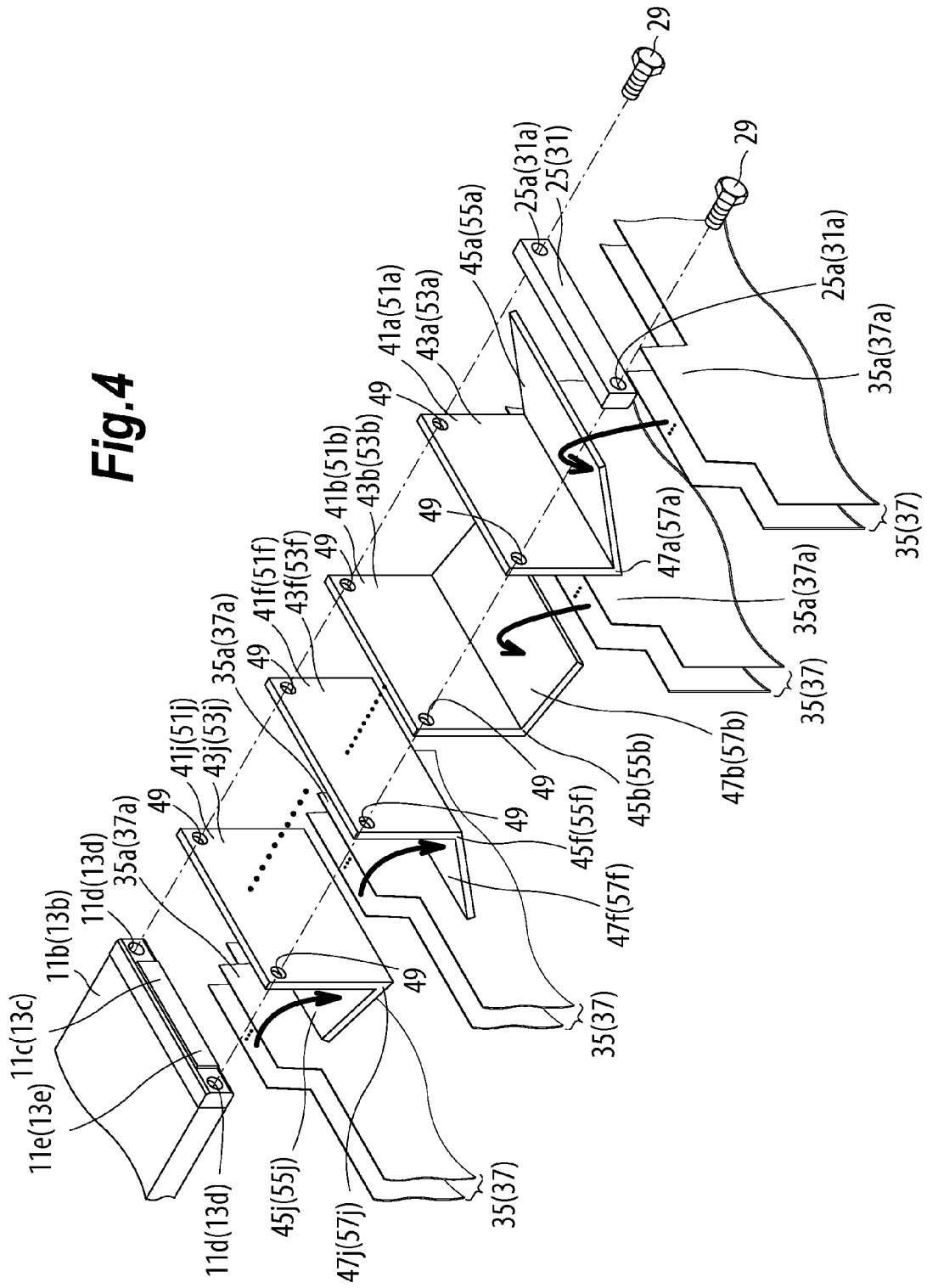
FIG. 4 illustrates positive tabs of positive electrodes, positive current collecting plates, a positive terminal, and bolts as disassembled.
Figure 5:
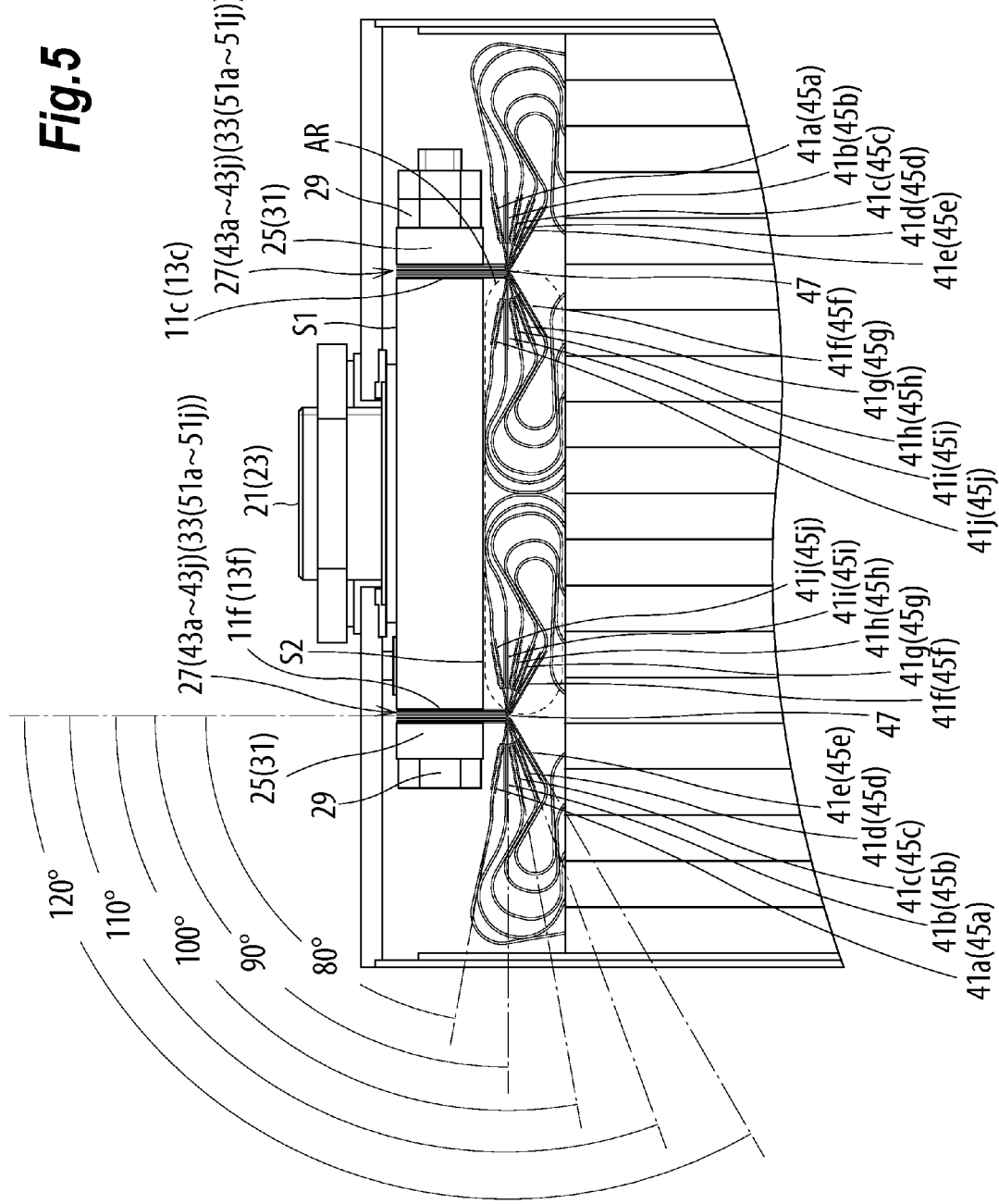
FIG. 5 schematically illustrates the current collecting structure for the positive terminal according to the embodiment of FIG. 1.

FIG. 4 illustrates the positive tabs 35a of the positive electrodes 35, the positive current collecting plates 41 (41a to 41j), the positive terminal 11, and the bolts 29 of the non-aqueous electrolyte secondary battery according to the embodiment as disassembled. FIG. 5 schematically illustrates the current collecting structure for the positive terminal 11 of the lithium-ion secondary battery 1 according to the embodiment. In the lithium-ion secondary battery 1 according to the embodiment, the current collecting structure on the positive electrode side and the current collecting structure on the negative electrode side are the same as each other. Thus, only the current collecting structure on the positive electrode side is illustrated and described, and the current collecting structure on the negative electrode side is partially not illustrated or described.

In FIGS. 4 and 5, the separators and the negative electrodes are not illustrated. In FIG. 5, in addition, in order to facilitate illustration, one positive electrode is illustrated as being welded to each positive current collecting plate. In practice, however, the positive tabs 35a of the plurality of positive electrodes 35 are welded to each of the positive current collecting plates 41a to 41j as illustrated in FIG. 4.

In the terminal body portion 11b of the positive terminal 11, two screw holes 11d to which the bolts 29 are to be fastened are formed in a surface 11c facing the stacking direction. The screw holes 11d are formed around both end portions of the surface 11c in the longitudinal direction. Female threads to be engaged with a threaded portion provided at the distal end of the bolts 29 are formed inside the screw holes 11d. The surface 11c is sized to perfectly match the positive pressing member 25. A projecting surface 11e is provided between the two screw holes 11d to project toward the positive pressing member 25 with respect to portions provided with the screw holes 11d. The projecting surface 11e projects toward the positive pressing member 25 by 0.2 mm with respect to the portions provided with the two screw holes 11d. In the terminal body portion 11b according to the embodiment, as illustrated in FIG. 5, screw holes 11d and a projecting surface 11e are also formed on a surface 11f of the terminal body portion 11b that is opposite to the surface 11c in the stacking direction, and two positive current collecting plate stacking portions 27 are attached to the two opposite surfaces of the terminal body portion 11b using the positive pressing members 25, the bolts 29, and nuts 13d.

In the terminal body portion 13b of the negative terminal 13, as in the terminal body portion 11b of the positive terminal 11, two surfaces 13c and 13f that are opposite to each other in the stacking direction are each formed with two screw holes 13d to which the bolts 29 are to be fastened and a projecting surface 13e. Female threads are also formed inside the screw holes 13d. The surfaces 13c and 13f are sized to perfectly match the negative pressing member 31.

The positive pressing member 25 is formed from aluminum in a substantially rectangular parallelepiped shape. The positive pressing member 25 is formed with two through holes 25a around both end portions of the positive pressing member 25 in the longitudinal direction to be penetrated by the bolts 29. The positive pressing member 25 is attached to the terminal body portion 11b of the positive terminal 11 with the positive current collecting plate stacking portions 27 held between the terminal body portion 11b and the positive pressing member 25.

The negative pressing member 31 is formed from copper in a substantially rectangular parallelepiped shape. The negative pressing member 31 is formed with two through holes 31a around both end portions of the negative pressing member 31 in the longitudinal direction to be penetrated by the bolts 29. The negative pressing member 31 is attached to the terminal body portion 13b of the negative terminal 13 with the negative current collecting plate stacking portions 33 held between the terminal body portion 13b and the negative pressing member 31.

Similarly, two negative current collecting plate stacking portions 33 are attached to the terminal body portion 13b of the negative terminal 13 according to the embodiment.

Eighteen positive tabs 35a are welded to each positive current collecting plate 41 by ultrasonic welding or laser welding. In FIG. 4, the positive current collecting plates to which the positive tabs 35a are welded are indicated by the arrows. In the embodiment, in addition, eighteen negative tabs 37a are welded to each negative current collecting plate 51 by ultrasonic welding or laser welding.

In the embodiment, as illustrated in FIG. 5, twenty positive current collecting plates 41 are divided into two groups of ten positive current collecting plates 41. In FIG. 4, only four positive current collecting plates 41a, 41b, 41f, and

41*j* are illustrated. The positive current collecting plates 41*a* to 41*j* each include a fixed portion 43 (43*a* to 43*j*) constituting the positive current collecting plate stacking portion 27, and a welded portion 45 (45*a* to 45*j*) to which the positive tabs 35*a* are welded. In the embodiment, the fixed portion 43 and the welded portion 45 are constituted by bending the positive current collecting plate 41, which is made of aluminum and formed in a substantially rectangular parallelepiped shape, at a bent portion 47 (47*a* to 47*j*). The positive current collecting plates 41*a* to 41*j* have the same shape before being bent. In the embodiment, the fixed portion 43 is formed with two through holes 49 around both end portions of a portion of the fixed portion 43 to be held between the terminal body portion 11*b* of the positive terminal 11 and the positive pressing member 25 to be penetrated by the bolts 29. The positive current collecting plate stacking portion 27 is constituted by sequentially stacking the welded portions 45*a* to 45*j*.

In the positive current collecting plate 41*a* attached adjacent to the positive pressing member 25, the welded portion 45*a* is bent in the direction from the terminal body portion 11*b* toward the positive pressing member 25. The positive current collecting plate 41*a* is bent such that the angle of the bent portion 47*a* between the fixed portion 43*a* and the welded portion 45*a* is 80°.

In the positive current collecting plates 41*b* to 41*e*, as in the positive current collecting plate 41*a*, the welded portions 45*a* are bent in the direction from the terminal body portion 11*b* toward the positive pressing member 25. The angles of the bent portions 47*b* to 47*e* of the positive current collecting plates 41*b* to 41*e* are 90°, 100°, 110°, and 120°, respectively. The welded portions 45*a* to 45*e* of the positive current collecting plates 41*a* to 41*e* are located outside a region AR that faces a surface S2 of the terminal body portion 11*b* located opposite to a surface S1 on which the terminal portion 11*a* is located. In the embodiment, the positive current collecting plates 41*a* to 41*e* constitute a second divided group of positive current collecting plates.

In the positive current collecting plates 41*f* to 41*j*, the welded portions 45*f* to 45*j* are bent in the direction from the positive pressing member 25 toward the terminal body portion 11*b*. The angles of the bent portions 47*f* to 47*j* of the positive current collecting plates 41*f* to 41*j* are 120°, 110°, 100°, 90°, and 80°, respectively. The welded portions 45*f* to 45*j* of the positive current collecting plates 41*f* to 41*j* are located in the region AR that faces the surface S2 of the terminal body portion 11*b* located opposite to the surface S1 on which the terminal portion 11*a* is located. In the embodiment, the positive current collecting plates 41*f* to 41*j* constitute a first divided group of positive current collecting plates.

Eighteen positive tabs 35*a* of the positive electrodes 35 are welded to each of the welded portions 45*a* to 45*j* of the positive current collecting plates 41*a* to 41*j* sequentially from an end portion of the electrode group 3 in the stacking direction. In the embodiment, the positive tabs 35*a* of the positive electrodes 35 that are closer in distance to the positive current collecting plate stacking portion 27 are welded to the positive current collecting plates 41 on the side of the center of the positive current collecting plate stacking portion 27. For example, the positive electrodes 35 located to overlap the positive current collecting plate stacking portion 27 when the electrode group 3 and the positive terminal 11 are seen from the battery lid 9 side are welded to the positive current collecting plates 41*e* and 41*f*. Meanwhile, the positive tabs 35*a* of the positive electrodes 35 that are farther in distance from the positive current collecting plate stacking portion 27 are welded to the positive current collecting plates 41 on the side of both ends of the positive current collecting plate stacking portion in the stacking direction. For example, the positive electrodes 35 located not to overlap the positive current collecting plate stacking portion 27 when the electrode group 3 and the positive terminal 11 are seen from the battery lid 9 side are welded to the positive current collecting plates 41*a* and 41*j*.

As illustrated in FIG. 5, the positive tabs of the positive electrodes welded to the positive current collecting plate 41*e* are welded to the positive current collecting plate after being significantly routed in the direction away from the positive current collecting plate stacking portion 27 compared to the positive tabs of the positive electrodes welded to the positive current collecting plate 41*a*. Therefore, the positive tabs can be connected to the positive current collecting plates even if the positive current collecting plates are of the same shape and the electrodes are of the same shape.

In the embodiment, twenty negative current collecting plates 51 are divided into two groups of ten negative current collecting plates 51 to constitute two negative current collecting plate stacking portions 33. The two negative current collecting plate stacking portions 33 are each constituted from ten negative current collecting plates 51 (51*a* to 51*j*). The negative current collecting plates 51*a* to 51*j* each include a fixed portion 53 (53*a* to 53*j*) constituting the negative current collecting plate stacking portion 33, and a welded portion 55 (55*a* to 55*j*) to which the negative tabs 37*a* are welded. In the embodiment, the fixed portion 53 and the welded portion 55 are constituted by bending the negative current collecting plate 51, which is made of nickel and formed in a substantially rectangular parallelepiped shape, at a bent portion 57. The fixed portion 53 is formed with two through holes 49 around both end portions of a portion of the fixed portion 53 to be held between the terminal body portion 13*b* of the negative terminal 13 and the negative pressing member 31 to be penetrated by the bolts 29. The negative current collecting plate stacking portion 33 is constituted by sequentially stacking the welded portions 55*a* to 55*j*.

The current collecting structure on the negative electrode side has the same structure as the current collecting structure on the positive electrode side. Thus, reference numerals of the components on the negative electrode side are given in parentheses in FIGS. 4 and 5 to omit description of the current collecting structure on the negative electrode side.

In the embodiment described above, a plurality of positive current collecting plates and negative current collecting plates are divided into two groups, and the fixed portions of the positive current collecting plates and the negative current collecting plates belonging to the groups are fixed to two surfaces of the terminal body portion that are opposite to each other in the stacking direction. As a matter of course, however, all the current collecting plates may be fixed to one surface of the terminal body portion without dividing the current collecting plates into two groups.

Figure 6:
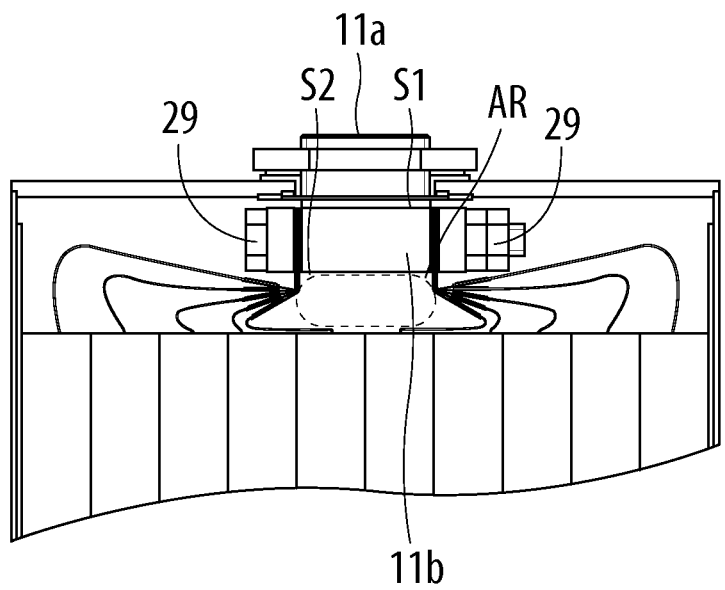
FIG. 6 schematically illustrates a current collecting structure for a positive terminal according to a second embodiment.
Figure 7:
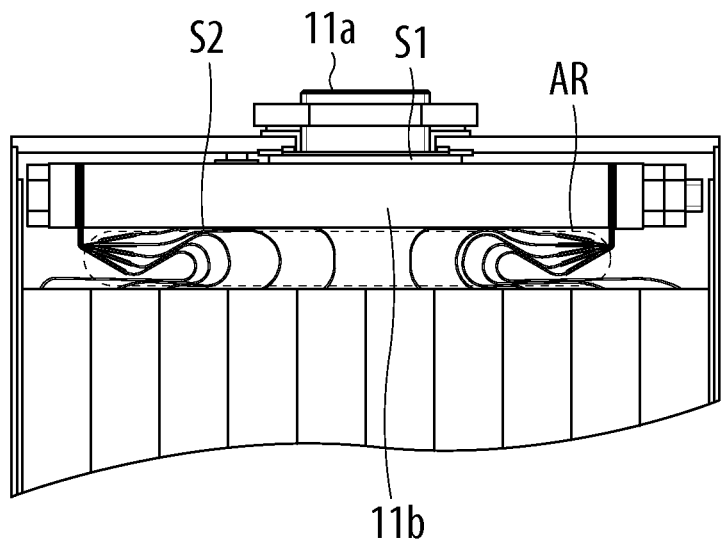
FIG. 7 schematically illustrates a current collecting structure for a positive terminal according to a third embodiment.
Figure 8:
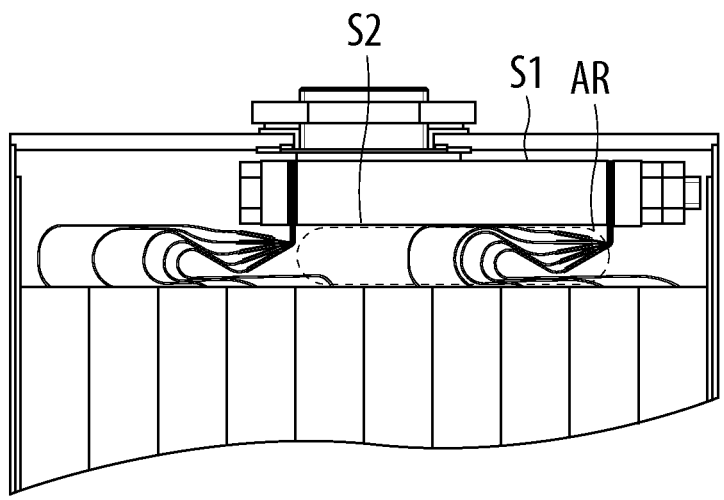
FIG. 8 schematically illustrates a current collecting structure for a positive terminal according to a fourth embodiment.

In the embodiment of FIG. 5, the current collecting plates belonging to each group are divided into a first divided group and a second divided group, the welded portions of the current collecting plates belonging to the first divided group are located in the region AR that faces the surface S2 of the terminal body portion 11*b* located opposite to the surface S1 on which the terminal portion 11*a* is located, and the welded portions of the current collecting plates belonging to the second divided group are located outside the region AR. However, a plurality of current collecting plates belonging to each group may not be divided into two divided groups. FIG. 6 illustrates a current collecting structure according to a second embodiment of the present invention. As illustrated in FIG. 6, the welded portions of a plurality of current collecting plates belonging to each group may be located outside the region AR that faces the surface S2 of the terminal body portion 11b located opposite to the surface S1 on which the terminal portion 11a is located. As in a third embodiment illustrated in FIG. 7, meanwhile, the welded portions of a plurality of current collecting plates belonging to each group may be located in the region AR that faces the surface S2 of the terminal body portion 11b located opposite to the surface S1 on which the terminal portion 11a is located. As in a fourth embodiment illustrated in FIG. 8, further, the welded portions of a plurality of current collecting plates belonging to one group may be located in the region AR that faces the surface S2 of the terminal body portion 11b located opposite to the surface S1 on which the terminal portion 11a is located, and the welded portions of a plurality of current collecting plates belonging to the remaining one group may be located outside the region AR that faces the surface S2 of the terminal body portion 11b located opposite to the surface S1 on which the terminal portion 11a is located.

Figure 9:
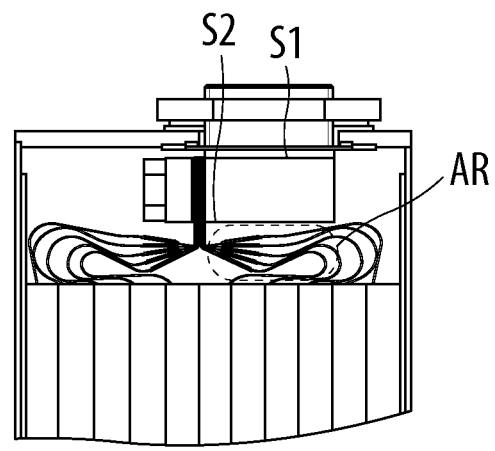
FIG. 9 schematically illustrates a current collecting structure for a positive terminal according to a fifth embodiment.
Figure 10:
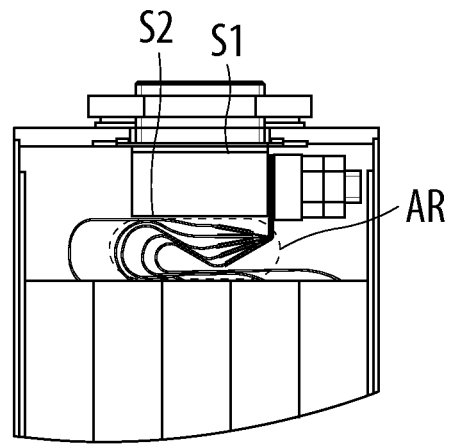
FIG. 10 schematically illustrates a current collecting structure for a positive terminal according to a sixth embodiment.

Further, the plurality of current collecting plates may be treated as one group without dividing the plurality of current collecting plates into two groups. In a current collecting structure according to a fifth embodiment illustrated in FIG. 9, a plurality of current collecting plates not divided into groups are welded to only one of surfaces of the terminal body portion 11b of the positive terminal 11 that are opposite to each other in the stacking direction. In FIG. 9, the plurality of current collecting plates are divided into two divided groups, the welded portions of the current collecting plates belonging to one of the divided groups are located in the region AR that faces the surface S2 of the terminal body portion 11b located opposite to the surface S1 on which the terminal portion 11a is located, and the welded portions of the current collecting plates belonging to the other divided group are located outside the region AR. Further, as in a sixth embodiment illustrated in FIG. 10, the plurality of current collecting plates may not be divided into two groups or two divided groups. In FIG. 10, the welded portions of all the current collecting plates are located in the region AR that faces the surface S2 of the terminal body portion 11b located opposite to the surface S1 on which the terminal portion 11a is located.

Figure 11:
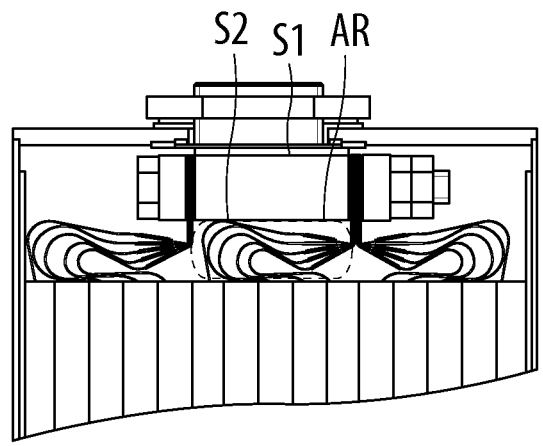
FIG. 11 schematically illustrates a current collecting structure for a positive terminal according to a seventh embodiment.
Figure 12:
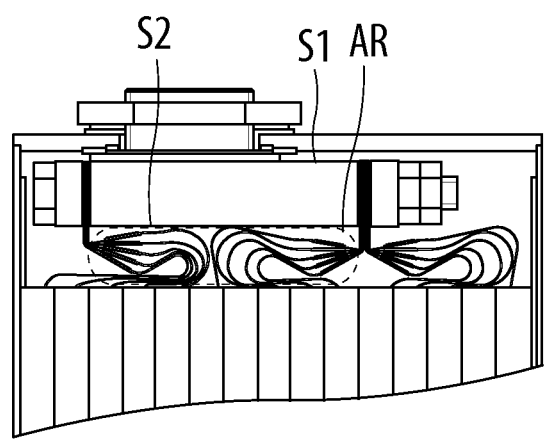
FIG. 12 schematically illustrates a current collecting structure for a positive terminal according to an eighth embodiment.

In the embodiment of FIGS. 1 to 5, the two groups of the plurality of current collecting plates are each divided into two divided groups. However, only one group of the plurality of current collecting plates may be divided into divided groups. In this case, as in a seventh embodiment illustrated in FIG. 11, for example, the welded portions of the plurality of current collecting plates not divided into divided groups may be located outside the region AR that faces the surface S2 of the terminal body portion 11b located opposite to the surface S1 on which the terminal portion 11a is located. Alternatively, as in an eighth embodiment illustrated in FIG. 12, the welded portions of the plurality of current collecting plates not divided into divided groups may be located in the region AR.

In the embodiment described above, the differences in angle between the bent portions of two adjacent positive current collecting plates (negative current collecting plates) are all 10°. As a matter of course, however, such differences in angle may be an angle other than 10°. In addition, the differences in angle between the bent portions of two adjacent positive current collecting plates and negative current collecting plates may be different from each other.

In the embodiment described above, the welded portions have the same length. As a matter of course, however, the welded portions may have different lengths.

While lithium-ion secondary batteries are described in the embodiments described above, the present invention is not limited thereto, and may be applied to other secondary batteries and current collecting structures for such secondary batteries as a matter of course.

INDUSTRIAL APPLICABILITY

In the current collecting structure according to the present invention, the welded portions of the current collecting plates are configured to radially extend from an end portion of the current collecting plate stacking portion on the electrode group side. Therefore, a necessary number of current collecting plates can be disposed in a limited space by determining predetermined angles as appropriate even if the number of current collecting plates is increased. Thus, according to the present invention, it is not necessary to increase the size of a space for arrangement of the plurality of current collecting plates even if the number of current collecting plates is increased.

DESCRIPTION OF REFERENCE NUMERALS 1 lithium-ion secondary battery
3 electrode group
5 battery container
7 battery case
9 battery lid
9a gas discharge valve
9b liquid injection port
11 positive terminal
11a terminal portion
11b terminal body portion
11c surface
11d screw hole
11e projecting surface
11f surface
13 negative terminal
13a terminal portion
13b terminal body portion
13c surface
13d screw hole
13e projecting surface
13f surface
15 inner packing
17 outer packing
19 terminal washer
21 positive terminal nut
23 negative terminal nut
25 positive pressing member
27 positive current collecting plate stacking portion
29 bolt
31 negative pressing member
33 negative current collecting plate stacking portion
35 positive electrode
35a positive tab
37 negative electrode
37a negative tab
39 separator
41 positive current collecting plate
43 fixed portion
45 welded portion 47 bent portion
51 negative current collecting plate
53 fixed portion
55 welded portion
57 bent portion

The invention claimed is:

1. A current collecting structure for a secondary battery including an electrode group including a plurality of electrodes each having a tab and stacked via a separator, the current collecting structure comprising:
a plurality of current collecting plates to which the tabs of the electrodes of the same polarity are welded; and
a terminal including a terminal body portion to which the current collecting plates are attached, and a terminal portion,
the plurality of current collecting plates each including a fixed portion and a welded portion onto which the tabs are welded in an overlapping manner, wherein the fixed portions of the current collecting plates are stacked to form a current collecting plate stacking portion to be fixed to the terminal body portion,
the plurality of current collecting plates being each bent so as to form a bent portion having a predetermined angle between the fixed portion and the welded portion, wherein:
the plurality of current collecting plates are divided into a first divided group located closer to the terminal body portion and a second divided group located farther from the terminal body portion;
the welded portion of each current collecting plate belonging to the first divided group is bent toward the terminal body portion between the fixed portion and the welded portion, and predetermined angle for the bent portions of the current collecting plates belonging to the first divided group is determined such that the predetermined angle of the bent portion of one of two adjacent current collecting plates that is located closer to the terminal body portion is smaller than the predetermined angle of the bent portion of the other current collecting plate that is located farther from the terminal body portion; and
the welded portion of each current collecting plate belonging to the second divided group is bent away from the terminal body portion between the fixed portion and the welded portion, and the predetermined angle for the bent portions of the current collecting plates belonging to the second divided group is determined such that the predetermined angle of the bent portion of one of two adjacent current collecting plates that is located closer to the terminal body portion is larger than the predetermined angle of the bent portion of the other current collecting plate that is located farther from the terminal body portion.

2. The current collecting structure for a secondary battery according to claim 1, wherein:
the plurality of current collecting plates are divided into two groups; and
the plurality of current collecting plates divided into two groups each include the fixed portion and a welded portion onto which the tabs are welded in an overlapping manner, and the fixed portions of the current collecting plates are stacked to form a current collecting plate stacking portion to be fixed to the terminal body portion;
the plurality of current collecting plates divided into two groups are each bent so as to form the bent portion having a predetermined angle between the fixed portion and the welded portion; and
the plurality of current collecting plates belonging to at least one of the two groups are divided into the first divided group located closer to the terminal body portion and the second divided group located farther from the terminal body portion.

3. The current collecting structure for a secondary battery according to claim 2, wherein:
the plurality of current collecting plates divided into two groups are fixed to two end surfaces of the terminal body portion that are opposite to each other in a stacking direction of the electrodes of the electrode group.

4. The current collecting structure for a secondary battery according to claim 1, wherein:
the predetermined angle of the bent portion of one of the current collecting plates belonging to the first divided group that is located the closest to the terminal body portion is an acute angle; and
the predetermined angle of the bent portion of one of the current collecting plates belonging to the second divided group that is located the farthest from the terminal body portion is an acute angle.

5. The current collecting structure for a secondary battery according to claim 1, wherein
a difference between the predetermined angles of the bent portions of the two adjacent current collecting plates is 5° to 15°.

6. A secondary battery comprising the current collecting structure according to claim 1.

7. A current collecting structure for a secondary battery including an electrode group including a plurality of electrodes each having a tab and stacked via a separator, the current collecting structure comprising:
a plurality of current collecting plates to which the tabs of the electrodes of the same polarity are welded; and
a terminal including a terminal body portion to which the current collecting plates are attached, and a terminal portion,
the plurality of current collecting plates each including a fixed portion and a welded portion onto which the tabs are welded in an overlapping manner, wherein the fixed portions of the current collecting plates are stacked to form a current collecting plate stacking portion to be fixed to the terminal body portion,
the plurality of current collecting plates being each bent so as to form a bent portion having a predetermined angle between the fixed portion and the welded portion, wherein:
the plurality of current collecting plates are disposed such that the welded portions are located in a region that faces a surface of the terminal body portion located opposite to a surface of the terminal body portion on which the terminal portion is located; and
the welded portions of each current collecting plate is bent toward the terminal body portion between the fixed portion and the welded portion, and the predetermined angle for the bent portions of the plurality of current collecting plates is determined such that the predetermined angle of the bent portion of one of two adjacent current collecting plates that is located closer to the terminal body portion is smaller than the predetermined angle of the bent portion of the other current collecting plate that is located farther from the terminal body portion.

8. The current collecting structure for a secondary battery according to claim 7, wherein:
- the plurality of current collecting plates are divided into two groups;
- the plurality of current collecting plates divided into two groups each include the fixed portion and the welded portion onto which the tabs are welded in an overlapping manner, and the fixed portions of the current collecting plates are stacked to form the current collecting plate stacking portion to be fixed to the terminal body portion;
- the plurality of current collecting plates divided into two groups are each bent so as to form the bent portion having a predetermined angle between the fixed portion and the welded portion; and
- the plurality of current collecting plates belonging to at least one of the two groups are disposed such that the welded portions are located in a region that faces a surface of the terminal body portion located opposite to a surface of the terminal body portion on which the terminal portion is located.

9. The current collecting structure for a secondary battery according to claim 8, wherein:
- the plurality of current collecting plates divided into two groups are fixed to two end surfaces of the terminal body portion that are opposite to each other in a stacking direction of the electrodes of the electrode group.

10. The current collecting structure for a secondary battery according to claim 7, wherein
- the predetermined angle of the bent portion of one of the plurality of current collecting plates that is located the closest to the terminal body portion is an acute angle.

11. The current collecting structure for a secondary battery according to claim 7, wherein
- a difference between the predetermined angles of the bent portions of the two adjacent current collecting plates is 5° to 15°.

12. A secondary battery comprising the current collecting structure according to claim 7.

13. A current collecting structure for a secondary battery including an electrode group including a plurality of electrodes each having a tab and stacked via a separator, the current collecting structure comprising:
- a plurality of current collecting plates to which the tabs of the electrodes of the same polarity are welded; and
- a terminal including a terminal body portion to which the current collecting plates are attached, and a terminal portion,
- the plurality of current collecting plates each including a fixed portion and a welded portion onto which the tabs are welded in an overlapping manner, wherein the fixed portions of the current collecting plates are stacked to form a current collecting plate stacking portion to be fixed to the terminal body portion,
- the plurality of current collecting plates being each bent so as to form a bent portion having a predetermined angle between the fixed portion and the welded portion, wherein:
- the plurality of current collecting plates are disposed such that the welded portions are located outside a region that faces a surface of the terminal body portion located opposite to a surface of the terminal body portion on which the terminal portion is located; and
- the welded portions of each current collecting plate is bent away from the terminal body portion between the fixed portion and the welded portion, and the predetermined angle for the bent portions of the current collecting plates is determined such that the predetermined angle of the bent portion of one of two adjacent current collecting plates that is located closer to the terminal body portion is larger than the predetermined angle of the bent portion of the other current collecting plate that is located farther from the terminal body portion.

14. The current collecting structure for a secondary battery according to claim 13, wherein:
- the plurality of current collecting plates are divided into two groups; and
- the plurality of current collecting plates divided into two groups each include the fixed portion and the welded portion onto which the tabs are welded in an overlapping manner, and the fixed portions of the current collecting plates are stacked to form a current collecting plate stacking portion to be fixed to the terminal body portion; and
- the plurality of current collecting plates divided into two groups are each bent so as to form a bent portion having a predetermined angle between the fixed portion and the welded portion.

15. The current collecting structure for a secondary battery according to claim 14, wherein
- the plurality of current collecting plates divided into two groups are fixed to two end surfaces of the terminal body portion that are opposite to each other in a stacking direction of the electrodes of the electrode group.

16. The current collecting structure for a secondary battery according to claim 13, wherein
- the predetermined angle of the bent portion of one of the plurality of current collecting plates that is located the farthest from the terminal body portion is an acute angle.

17. The current collecting structure for a secondary battery according to claim 2, wherein
- a difference between the predetermined angles of the bent portions of the two adjacent current collecting plates is 5° to 15°.

18. A secondary battery comprising the current collecting structure according to claim 13.

* * * * *